United States Patent
Dunfee et al.

(10) Patent No.: US 11,815,523 B2
(45) Date of Patent: Nov. 14, 2023

(54) MULTI-POINT FILTERING LIQUID LEVEL DETECTION METHODS AND APPARATUS

(71) Applicant: Siemens Healthcare Diagnostics Inc., Tarrytown, NY (US)

(72) Inventors: William D. Dunfee, Newark, DE (US); Mark H. Sprenkle, Newark, DE (US); Colin Ingersoll, Wilmington, DE (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 0 days.

(21) Appl. No.: 18/248,127

(22) PCT Filed: Oct. 6, 2021

(86) PCT No.: PCT/US2021/053851
§ 371 (c)(1),
(2) Date: Apr. 6, 2023

(87) PCT Pub. No.: WO2022/076616
PCT Pub. Date: Apr. 14, 2022

(65) Prior Publication Data
US 2023/0273231 A1  Aug. 31, 2023

Related U.S. Application Data

(60) Provisional application No. 63/088,934, filed on Oct. 7, 2020.

(51) Int. Cl.
G01N 35/10 (2006.01)
G01N 35/00 (2006.01)

(52) U.S. Cl.
CPC ..... *G01N 35/1009* (2013.01); *G01N 35/0099* (2013.01); *G01N 35/1002* (2013.01); *G01N 2035/1025* (2013.01)

(58) Field of Classification Search
CPC .......... G01N 35/1009; G01N 35/0099; G01N 35/1002; G01N 2035/1025
See application file for complete search history.

(56) References Cited

U.S. PATENT DOCUMENTS

| | | | |
|---|---|---|---|
| 4,977,786 A | 12/1990 | Davis | |
| 5,550,059 A | 8/1996 | Boger et al. | |
| 6,227,053 B1 * | 5/2001 | Purpura | G01N 29/4427 73/290 V |
| 6,370,942 B1 | 4/2002 | Dunfee et al. | |

(Continued)

FOREIGN PATENT DOCUMENTS

WO  2020/038853 A1  2/2020

OTHER PUBLICATIONS

PCT International Search Report and Written Opinion dated Jan. 6, 2022 (7 Pages).

*Primary Examiner* — Jill A Warden
*Assistant Examiner* — John McGuirk

(57) ABSTRACT

A method of detecting a level of a liquid in a well of a container. The method includes looking up an expected liquid level of the liquid in the well of a container; measuring and recording a measured liquid level of the liquid in the well; changing a level of the liquid in the well based upon an expected amount of the liquid to be added or removed; and calculating a next expected liquid level at least in part based on multi-point filtering. Apparatus for carrying out the method are provided, as are other aspects.

21 Claims, 11 Drawing Sheets

(56) References Cited

U.S. PATENT DOCUMENTS

| | | |
|---|---|---|
| 7,150,190 B2 | 12/2006 | Krufka et al. |
| 7,186,378 B2 | 3/2007 | Dunfee |
| 7,477,997 B2 | 1/2009 | Kaplit |
| 7,634,378 B2 | 12/2009 | Kaplit |
| 7,867,769 B2 | 1/2011 | Dunfee et al. |
| 7,867,789 B2 | 1/2011 | Lu et al. |
| 7,926,325 B2 | 4/2011 | Kaplit |
| 8,072,594 B1 | 12/2011 | McMahon |
| 9,863,905 B2 | 1/2018 | Wiedekind-Klein |
| 2012/0003731 A1 | 1/2012 | Kuroda |
| 2012/0024055 A1 | 2/2012 | Knight et al. |
| 2015/0276534 A1 | 10/2015 | Dunfee |
| 2016/0258972 A1 | 9/2016 | Zordan |
| 2018/0321071 A1 | 11/2018 | Larsen |

* cited by examiner

MULTI-POINT FILTERING LIQUID LEVEL DETECTION METHODS AND APPARATUS

CROSS REFERENCE TO RELATED APPLICATION

This application claims the benefit of U.S. Provisional Patent Application No. 63/088,934, entitled "MULTI-POINT FILTERING LIQUID LEVEL DETECTION METHODS AND APPARATUS" filed Oct. 7, 2020, the disclosure of which is incorporated by reference in its entirety for all purposes.

FIELD

The present invention relates generally to methods and apparatus configured to determine a liquid level associated with aspiration of liquids, such as when aspirating reagent liquids from a well of a container.

BACKGROUND

In testing within diagnostic laboratories to measure various chemical constituents of body fluids obtained from patients, such as whole blood, blood serum, blood plasma, interstitial fluid, cerebrospinal fluid, urine, and the like, fully-automated analyzers may reduce the number of trained technicians required to perform the analyses, improve accuracy of the testing, and reduce the cost per test.

Typically, an automated analyzer includes an automated aspirating and dispensing apparatus, which is configured to aspirate a liquid (e.g., a liquid reagent) from a well of a container and dispense that liquid into a reaction vessel (e.g., a cuvette). The aspirating and dispensing apparatus typically includes a pipette (otherwise referred to herein as a "probe") mounted on a robotic mechanism, such as a robotic gantry or robot arm, to allow a defined motion of the probe and perform the aspiration and dispensing functions to allow transfer of the liquid (e.g., reagent) to the reaction vessel. Separate probes may be used for the sample and reagent aspiration and dispense operations in order to avoid cross contamination.

During the aspiration operation, the robotic mechanism, which may be under the control of a controller, may position the probe above a well of a reagent container, and then descend the probe into the well until the probe is partially immersed in the liquid reagent to a desired well depth. The depth the probe is descended to underneath the top liquid surface in the well is referred to as the "well depth (WD)" A pump or other aspirating device is then activated to draw in (aspirate) a portion of the reagent liquid from the container into the interior of the probe. The probe is then ascended (retracted) from the container with the reagent liquid in the probe such that the reagent liquid may be transferred to the reaction vessel for testing.

Ancillary to the aspiration of the liquid reagent in the well, it may be desirable to determine a location of a top surface of the reagent liquid contained in the well. For example, knowing the location of the top liquid surface of the liquid reagent may aid in avoiding the aspiration of air. Likewise, knowing the location of the top surface of the liquid reagent in the well can aid in locating the probe at the proper well depth. Commonly, the top liquid surface is located by using a probe with a capacitive sensor embodied therein. When the liquid surface is contacted, a change in electrical signal is detected by a capacitive measurement circuit. However, in some instances, the measurements can be erroneous. For example, level detection is occasionally triggered above the top liquid surface, or in some instances is not triggering at all.

Accordingly, there is a need for a method and apparatus to more accurately determine a location of the top liquid surface.

SUMMARY

Detection of a liquid level in a reagent supply container is used in many types of diagnostic equipment, such as clinical chemistry analyzers and immunoassay instruments (each is referred to herein as an "analyzer"). For example, the liquid level detection can be used to detect the top surface level of a reagent liquid in a well. Although the examples provided herein are directed at detecting a liquid surface of a reagent liquid in a well of a reagent container, such detection methods and apparatus can also be used for detection of a liquid level (top surface location) of other liquids, such as process water (e.g., deionized water), waste liquid, or even a cleaning liquid.

In some embodiments, a capacitive level detection system is used to determine the liquid level and position the probe in the liquid based where the surface level is detected by the capacitive level detection system. However, such capacitive level detection systems can be subject to errors if the capacitive level detection fires in error, such as with the presence of foam or static charge, or fails to fire when it should. In some embodiments, liquid level detection by use of a capacitive sensor embodied in a probe that is coupled to, and moveable by, a robotic transfer arm can have incidences of incorrect triggers. For example, the positioning system of the robot causing motion of the probe can malfunction, such as due to a position sensor error, a broke wire, or other component malfunction. As a result, tests may be aborted and possibly rescheduled, thus wasting time. Further, reagent containers such as reagent packs including multiple wells are sometimes unloaded in error because of a false liquid level reading, which can cause discarding of a reagent pack that still has useable reagent therein. Thus, such errant liquid level readings can increase reagent costs by initiating premature reagent pack change out.

The accuracy of the detection sensor can be influenced by numerous additional factors, including hardware malfunctions, environmental conditions, or abnormalities in the container. Capacitive level detection systems, while they may be preferred for a wide range of applications, are can be vulnerable to such influences. When used for aspiration, erroneous level detect signals can result in the probe being out of position for a proper aspiration, thus leading to inaccuracy in transferred volume of liquid, such as by aspirating air or foam, or excessive contamination of the outside surface of the probe with reagent liquid by possible insertion too deeply into the well. Such excessive contamination of the exterior of the probe is referred to herein as "carryover." Carryover can drip from the probe, but is generally washed from the outside of the probe at a wash station of the analyzer prior to dispense of the reagent liquid.

In some cases, liquid level has no predictability, i.e., is essentially random. However, in many cases, such as that within a reagent container, the liquid level has some predictability based on its prior history of surface level location. In these cases, an improved method of level detection is provided. The improved level detection method uses historical knowledge of the level of the liquid in the well, as well as estimates of the volume removed via each aspiration over a period of time, to determine an expected liquid level to be encountered prior to each aspiration. In particular, the method uses the actual measured surface location value and a multi-point filtering technique to determine current liquid level. For example, the multi-point filtering technique can use proportional control and a normalized liquid level output of the liquid level sensor as feedback to generate the next expected liquid level with a specific correction, thus correcting the expected liquid level based on measurements of actual measured level of the liquid surface and a correction factor based on a gain value.

In some embodiments, this allows for filtering of the actual liquid level output readings of the liquid level sensor, so that spurious readings can be detected and minimized, thus minimizing or preventing erroneous responses. In some embodiments, a pre-filter may be provided, which removes clearly outlying liquid level values (outliers) before a multi-point filter is applied, thus further improving resiliency to incorrect liquid level sensor readings.

If on occasion, the method determines that erroneous signals or unexpected changes in liquid level do occur (as determined by monitoring of the actual liquid level), the next expected liquid level expected by the probe is adjusted (e.g., downwards) so that the next aspiration is likely to be within liquid, allowing normal aspiration operation to continue. In some embodiments, a correction limit may be employed so as to limit adjustments (excursions) from the theoretical liquid level for the next liquid level.

Method and apparatus embodiments of this disclosure can be used for aspirating reagent liquid out of a reagent container, but the methods and apparatus described herein could be employed for detecting and/or tracking liquid level in any type of container where the changes in level are semi-predictable, such as when the level changes are based on a volume of the liquid being used in a test.

Thus, in a first embodiment, a method of detecting a level of a liquid in a well is provided. The method includes looking up an expected liquid level of the liquid in the well, ramping a probe into the well containing the liquid to a well depth, measuring and recording a measured liquid level of the liquid from the ramping; and calculating a next expected liquid level at least in part based on multi-point filtering.

According to other embodiments, a liquid level detection apparatus is provided. The liquid level detection apparatus includes a liquid level sensor configured to obtain liquid level measurements of a liquid in a well, and a processor configured to receive the liquid levels and calculate according to a multi-point filtering module a next expected liquid level. In some embodiments, a probe is configured to aspirate the liquid.

In yet another method embodiment, a method of detecting a level of a liquid in a well is provided. The method includes looking up an expected liquid level of the liquid in the well of a container; measuring and recording a measured liquid level of the liquid in the well; changing a level of the liquid in the well based upon an expected liquid to be added or removed, such as based on a test; and calculating a next expected liquid level at least in part based on multi-point filtering.

Still other aspects, features, and advantages of the present disclosure may be readily apparent from the following detailed description by illustrating a number of example embodiments, including the best mode contemplated for carrying out the present invention. The present disclosure may also be capable of other and different embodiments, and its several details may be modified in various respects, all without departing from the scope of the present disclosure. Accordingly, the drawings and descriptions are to be regarded as illustrative in nature, and not as restrictive. The disclosure is to cover all modifications, equivalents, and alternatives falling within the scope of the claims and their equivalents.

BRIEF DESCRIPTION OF THE DRAWINGS

The present disclosure will be better understood by referring to the detailed description taken in conjunction with the following drawings. The drawings are not necessarily drawn to scale. Like numerals are used to denote like elements herein.

DETAILED DESCRIPTION

In view of the foregoing difficulties, there is an unmet need to accurately determine a location of a top liquid surface, such as in liquid aspiration of liquid reagents used as part of an analysis of a biological liquid (bio-liquid) by an analyzer to determine a presence and concentration of an analyte or other constituent of interest in the bio-liquid. In particular, the apparatus and method described herein have utility for use in analyzers that are configured to carrying out analyte measurements, assays, immunoassays, or other tests where bio-liquids and liquid reagents are aspirated and dispensed and where having an accurate measure of the liquid level is desirable.

In one aspect, embodiments of the present disclosure provide methods and apparatus that can substantially reduce the error in determining a top liquid surface level in a container of liquid, such as a reagent liquid. In particular, embodiments of the present disclosure may accurately determine the liquid level by filtering a normalized liquid level reading with a multi-point filter. Although the present disclosure utilizes examples of detecting location of a top liquid surface of a liquid reagent, the present disclosure may also be used, and is applicable for, accurately determining the location of other liquids used in analyzers, such as process water, waste liquid in a waste receptacle that must be emptied from time to time, and cleaning solution used to clean pipettes and/or cuvettes.

In particular, the inventors herein have discovered that in an aspiration apparatus including an aspiration pump, a probe, and a robot apparatus for moving the probe that errant measurements can occur that then contaminate the next liquid surface level so that an improper calculation of the top surface level may occur. For example, it is desired that the probe be located below the top surface of the reagent liquid by a few millimeters (e.g., 2 mm to 6 mm), so as to minimize carryout. However, if the measured liquid level is wrong, say is calculated to be too low as compared to the actual location, then the probe will be instructed to dive too deep into the well and an amount of carryout may be excessive. Moreover, the liquid reagent may be instructed by the controller to be removed prematurely. If the calculated liquid level is too high as compared to the actual location, then the probe may aspirate air or foam. Thus, for proper operation over the many aspirations and to ensure full use of the reagent in the well, an accurate liquid level accounting is desired to be obtained.

Therefore, the methods and apparatus herein provide improved accuracy of liquid level detection according to embodiments. These and other aspects and features of embodiments of the present methods and apparatus will be described with reference to FIGS. 1-8 herein.

Figure 1:
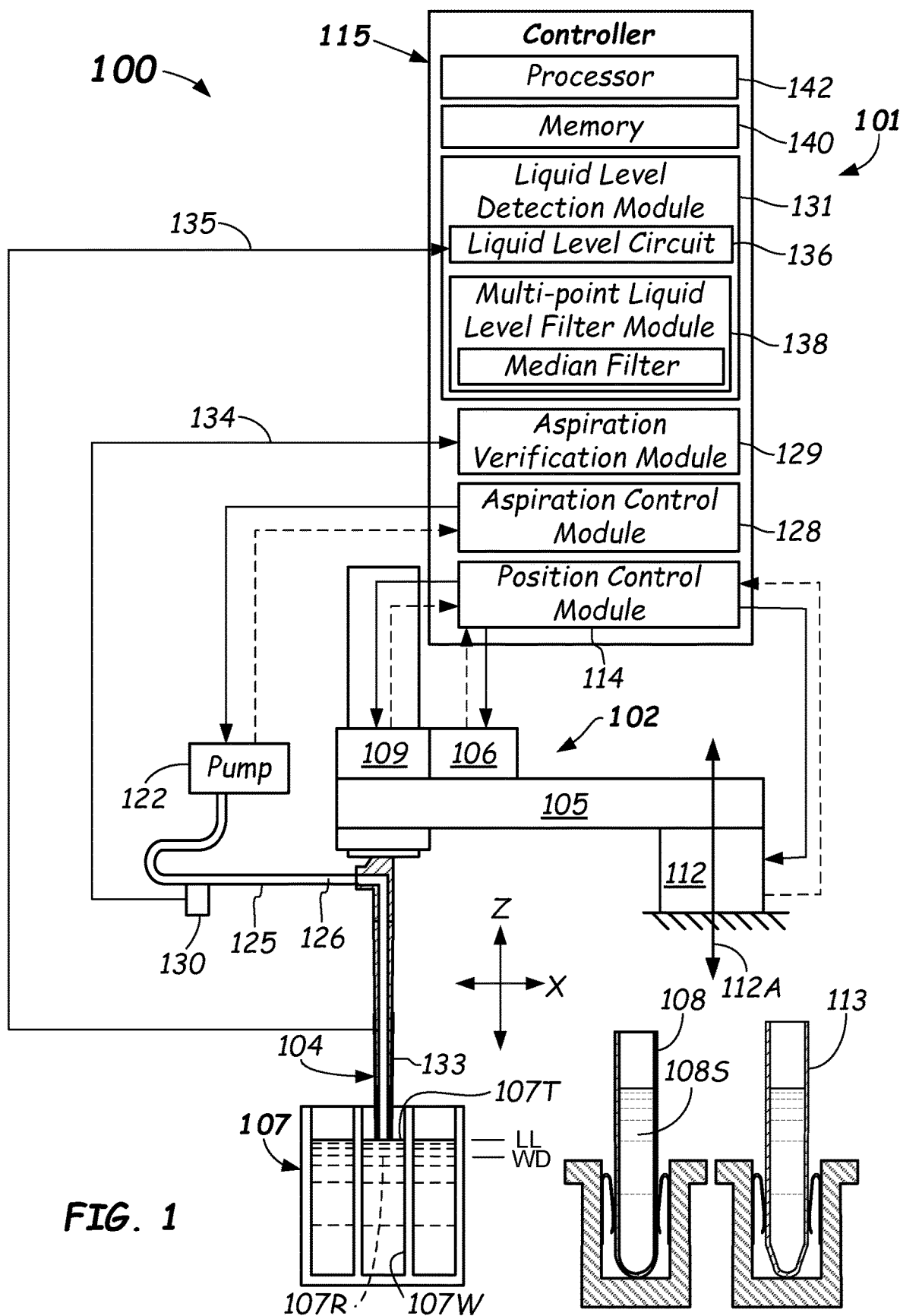
FIG. 1 illustrates a schematic diagram of an aspirating apparatus including liquid level measurement according to embodiments of the disclosure.

Referring now to FIG. 1, a first embodiment of an aspiration apparatus 100 including a level detection apparatus 101 according to the disclosure is illustrated. The aspiration apparatus 100 may include any suitable robot 102 that is configured to move a probe 104 as needed in order to aspirate a liquid, such as a liquid reagent 107R. Liquid reagent 107R may also be dispensed by the aspiration apparatus 100. The robot 102 is adapted to carry out motion of the probe 104 in one or more coordinate directions, such as X, Y (into and out of the paper), and/or Z. The robot 102 may include a robot member 105 (e.g., robot arm, boom, frame, or the like) to which the probe 104 may be mounted for motion. The robot member 105, which may be a robot arm as shown, may swing about a fixed axis 112A by the operation of a rotational actuator 112 to provide horizontal motion capability in the X-Y plane, for example. Optionally or additionally, vertical motion of the probe 104 along a vertical Z-axis may be imparted by operation of a suitable vertical actuator 109, such as a linear actuator of the robot 102, which may be coupled to the probe 104. The vertical actuator 109 may be operable to descend and ascend the probe 104 into and out of a container 107 (e.g., reagent container) having one or more wells 107W including a volume of a liquid reagent 107R, so that at least some may be aspirated and transferred to and dispensed into a reaction vessel 113 along with sample 108S of biological liquid contained in a sample container 108. The sample 108S may be blood, blood serum, blood plasma, cerebral liquid, spinal liquid, interstitial liquid, urine, and the like. Other liquids may be aspirated and dispensed. Additionally or optionally, an actuator 106 such as a linear actuator may be provided to impart motion along the X-axis. Each of the actuators 106, 109, 112 may be suitably actuated under the control of a position control module 114 of a controller 115 to impart the desired motions to the probe 104 in one-dimensional, two-dimensional, or three-dimensional space.

Each of the actuators 106, 109, 112 may be configured and operable to move the probe 104 from the container 107 to a reaction vessel 113 (e.g., a cuvette). A separate probe (not shown), or the same probe with intervening cleaning, may be used to aspirate sample 108S from the sample container 108 and dispense it into the reaction vessel 113. The aspirator apparatus 100 may be provided to aspirate the desired liquid (e.g., liquid reagent 107R) into the interior of the probe 104. The aspirated volume may be up to about 100 uL, but may be less than about 25 µL in some embodiments.

The aspirator apparatus 100 may include a pump 122, such as a piston-type pump that may be driven by a suitable motor (not shown). Other types of pumps may be used. The pump 122 is configured to cause the liquid reagent 107R to aspirate into the probe 104 at an aspiration rate for a predetermined period of time, which creates a pressure signal in line 134 from a pressure sensor 130. A range of aspiration rates achievable by the aspiration apparatus 100 are between about 20 microliters per second and about 500 microliters per second. The pump 122 may be fluidly coupled to the probe 104 by a flexible tube 125, such as by a section of hollow Teflon tube or other suitably flexible conduit. The flexible tube 125 and the probe 104 are filled with a backing liquid 126 (e.g., purified water) to provide a suitable liquid backing to be able to generate an appropriate vacuum pressure to carry out aspiration of the liquid (e.g., liquid reagent 107R) into an interior passage of the probe 104 for transfer to the reaction vessel 113.

Aspiration control module 128 of the controller 115 may be configured and operational to control the pump 122 to draw in (e.g., aspirate) a desired amount of the liquid (e.g., liquid reagent 107R) into the interior of the probe 104. Aspiration control module 128 of the controller 115 may also control the dispensing operations performed by the aspiration apparatus 100. The aspiration apparatus 100 may include other conventional components, such as one or more valve(s), accumulator(s), distributors, or other hydraulic components (not shown) to effectuate the liquid aspiration and dispense. Any suitable apparatus for aspirating the liquid into the probe 104 may be used. For example, aspirating and dispensing systems, which may be used, are described in U.S. Pat. Nos. 7,867,769; 7,634,378; 7,477, 997; 7,186,378; 7,150,190; and 6,370,942, for example.

According to embodiments, a full cycle of an aspiration of the liquid (e.g., liquid reagent 107R) may be completed in less than about 300 ms, or even less than about 200 ms, or even less than about 100 ms in some embodiments. In some embodiments, the aspiration cycle may be completed in between about 40 ms and about 200 ms. Other aspiration durations may be used.

In accordance with one or more embodiments, aspiration verification module 129 may also be used to verify the effectiveness of the liquid aspiration. For example, the aspiration verification module 129 may determine the presence of air in the probe 104 during aspiration by determining if there is a low viscosity error. A low viscosity error is registered if an aspiration is conducted and certain pressure pre-established parameters are not met. A low viscosity error indicates that air was aspirated rather than liquid. In another example, the aspiration verification module 129 may determine the presence of a clog or other obstruction in the probe 104.

In more detail, the aspiration pressure in the flexible tube 125 may be measured by a pressure sensor 130. The pressure sensor 130 is operational and configured to provide a raw pressure signal in line 134. The pressure sensor 130 may be located at any suitable location along the flexible tube 125 or adjacent the pump 122 or probe 104. Sensor conditioning may be provided to condition the raw pressure signal in line 134, as is conventional. This sensor conditioning may include a suitable amplifier, A/D converter, and a suitable anti-aliasing filter, for example.

Figure 2:
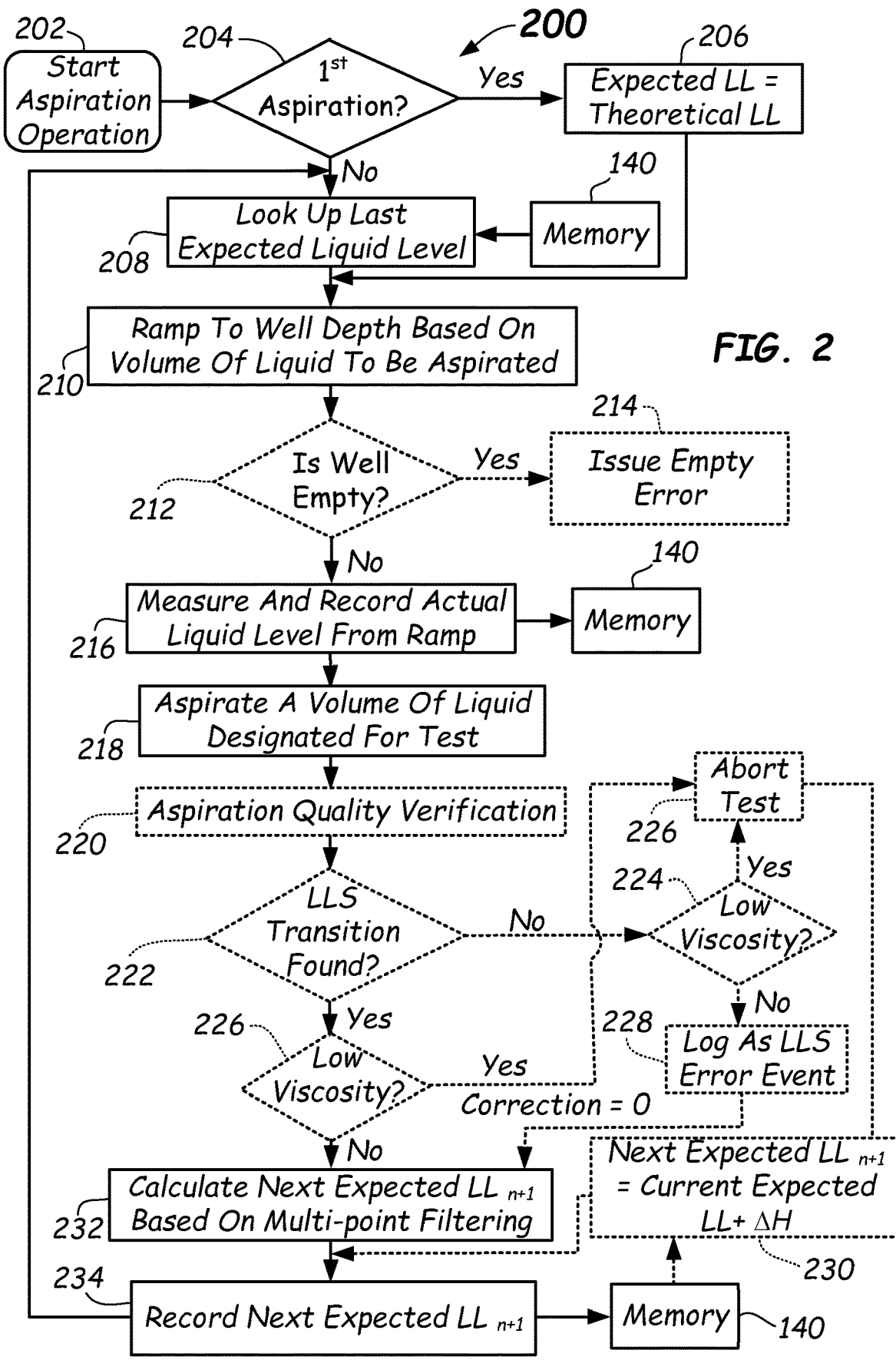
FIG. 2 illustrates a decisioning flowchart illustrating methods of detecting a liquid level of a liquid in a well of a container according to embodiments of the disclosure.

According to embodiments of the disclosure, as will be explained with reference to FIGS. 1 and 2, the aspiration apparatus 100 further includes liquid level detection module 131. Liquid level detection module 131 is configured to accurately determine the level of the top liquid surface 107T of the liquid reagent 107R in the well 107W. Liquid level detection module 131 can include a liquid level sensor. Liquid level sensor 133 can be, for example, a capacitive sensor that is integral with the probe 104 such that when the probe tip contacts the top liquid surface 107T of the liquid reagent 107R, an electrical signal is generated, which is carried by line 135 and discriminated by a liquid level circuit 136 (e.g., a capacitive level circuit) of the liquid level detection module 131. Capacitive liquid level sensors and capacitive level circuits are described in, for example, U.S. Pat. Nos. 4,977,786, 5,550,059, 7,150,190, and 9,863,905. However, it should be recognized that other types of liquid level sensors and liquid level circuits may be used, such as an optical sensor, ultrasonic sensor, conductivity or resistance sensor, and the like.

Liquid level detection module 131 further includes a multi-point liquid level filter module 138. The multi-point liquid level filter module 138 may comprise a method 200 that takes multiple liquid level readings from memory 140 and processes them, such as in processor 142 of controller 115. For example, in some embodiments, a currently measured liquid level value and two or more previously-obtained liquid level measurements can be used. In particular, the multi-point liquid level filter module 138 may include a digital filter wherein the filtering takes place in software within the controller 115.

Operation and filtering carried out by the multi-point liquid level filter module 138 will now be described with reference to FIG. 2, which illustrates a flowchart of the various actions that are conducted according to the method 200 when determining a liquid level of a well 107W containing the liquid reagent 107R. The method 200 initiates upon the controller 115 determining that an aspiration from the well 107W is to take place, such as upon initiation of an ordered test at an analyzer having a sample being received for testing thereat. From the start of the aspiration sequence at block 202, the method 200 can determine if the aspiration is a first aspiration at block 204. If the answer is Yes, then the well is hypothetically full and an expected well level (synonymous with top liquid surface location) is assigned a theoretical well level in block 206. The theoretical liquid level is a level that the particular reagent 107R contains from the factory, i.e., a factory fill level. This value is usually relatively-tightly controlled.

According to the method 200, if the answer at block 204 is No, then in block 208, the expected well level is assigned the last expected well level that was stored in memory 140 after filtering according to the method 200. Thus, in either case, Yes or No, a next expected well level is provided, either the theoretical well level or the last expected well level. Next, in block 210, the probe 104 is ramped to a well depth WD by the action of the robot 102. In operation, during aspiration, the robot 102 may position the probe 104 above the container 107 and descend the probe 104. The descent into the container 107 can be produced by the action of the vertical actuator 109 under the control of the position control module 114 until the probe 104 reaches a desired well depth WD therein.

When at the well depth WD, the method 200 can optionally test to see if the well 107W is empty. Empty is determined to be an expected level that is a few millimeters above the bottom of the container 107, for example. Thus, in block 212, the method 200 determined if the well 107W is empty. If the well 107 is empty (yes) then an empty error may be issued to the operator in block 214, such that aspiration from a new well 107W can commence or that the container 107 can be replaced. If the well in not empty (No), then in block 216, the actual liquid level is measured and recorded. The actual liquid level is the liquid level that is measured as the probe 104 is ramped downward. For example, the as the probe 104 touches the top liquid surface 107S, the liquid level circuit 136 detects a change, such as a change in capacitance from liquid level sensor 133. This level is recorded in memory 140 as the actual liquid level.

Next, in block 218, a volume of the liquid reagent 107R is aspirated into the probe 104 for carrying out the test. The aspirator apparatus 100 may be operated via a signal from the aspiration control module 128 to draw off the predefined volume of the liquid reagent 107R for the particular test into the inner passage of the probe 104. As the pump 122 is operated, the level of liquid reagent 107R in the container 107 is attempted to be drawn down (aspirated). When it is determined that a desired volume of liquid 107R has been received within the probe 104, as measured by aspiration control module 128, the pump 122 may be stopped such that no further aspiration of the liquid reagent 107R occurs. This may be determined by a suitable feedback sensor (not shown) on the motor driving the pump 122 and therefore providing feedback on the position of the pump 122. Any suitable position feedback may be provided.

Optionally, in block 220, it may be desirable to determine further that the aspiration has been successful, such as by carrying out aspiration quality verification. During the aspiration process, a representative raw aspiration pressure in line 134 may be measured (e.g., the measured aspiration pressure) via the pressure sensor 130. This raw measured pressure in line 134 may be converted (ND), conditioned, and filtered by the aspiration verification module 129 to provide a conditioned pressure signal. By examining this conditioned pressure signal, it is possible to accurately determine aspiration quality, and in particular whether air has been aspirated. Aspiration verification can be accomplished by any known method, such as those described in U.S. Pat. Nos. 7,477,997 7,867,789, 7,926,325, US2015/0276534, and US 2016/0258972.

For example, in some embodiments, in order to verify the effectiveness (e.g., quality) of the aspiration in block 220, the conditioned pressure signal is compared at an evaluation point of the conditioned pressure trace over the aspiration. At the desired evaluation point, the conditioned pressure signal is compared to a pre-established threshold value. If the conditioned pressure signal is above the pre-established threshold value, then the aspiration may be deemed to be successful. If the conditioned pressure signal has a value that is below the pre-established threshold value, then the aspiration may be deemed to be unsuccessful or incomplete. This can signify that some air was aspirated.

Referring again to FIG. 2, after the aspiration in block 218, the aspiration apparatus 100 looks for a liquid level sensing transition (LLS transition) in block 222. Determining if there was a LLS transition in block 222 involves examining the signal in line 135 by the liquid level circuit 136 of the liquid level detection module 131 if FIG. 1. For example, as the probe 104 is lowered, a spike in voltage sensed by the liquid level circuit 136 above a predefined voltage value can be indicative of a positive affirmation that an LLS transition is present (Yes). If a LLS transition is not detected (No) in block 222, then using the aspiration quality verification from block 220, it is then determined if a low viscosity has occurred in block 224. Low viscosity in block 224 means the viscosity was much lower than expected, such as a pressure reading in line 134 that is lower than an expected value, such as being below a predetermined threshold value. An indication of low viscosity (Yes) in block 224 indicates that not only was no LLS transition detected, but also that air was likely aspirated. In this instance, the test is aborted in block 226, and the next expected liquid level is assigned in block 230 to be the current expected level stored in memory 140 minus ΔH. In this case, ΔH is a theoretical change in height of the liquid level based on the theoretical amount of reagent liquid 107L required for that test currently being conducted.

If no LLS transition is found in block 222 and no low viscosity was detected in block 224, then the assumption is that an aspiration has taken place but that the liquid level sensor 133 or the liquid level circuit 136 or line 135 has malfunctioned. In this case, the LL sensing event can be logged as an error in block 228. However, in this case, the correction is made to be zero and the next expected liquid level is calculated based on multi-pointy filtering in block 232, as is fully described in FIG. 3. Following the calculation of the next expected liquid level based on multi-pointy filtering in block 232, the next expected liquid level is recorded in memory 140 in block 234. The method 200 then contuse at block 208 for the next aspiration for a new test.

The details of the multi-point filtering of block 232 employed by the method 200 will now be described with reference to FIG. 3. First, the actual measured liquid level is obtained from memory 140 in block 336. This measured liquid level was recorded in block 216 (FIG. 2) from the ramp to well depth WD in block 210. The position of the probe tip of probe 104 from the position control module 114 was previously recorded when the top liquid surface 107S of the liquid reagent 107R was sensed by liquid level sensor 133 and liquid level circuit 136 of the liquid level detection module 131.

Figure 5A:
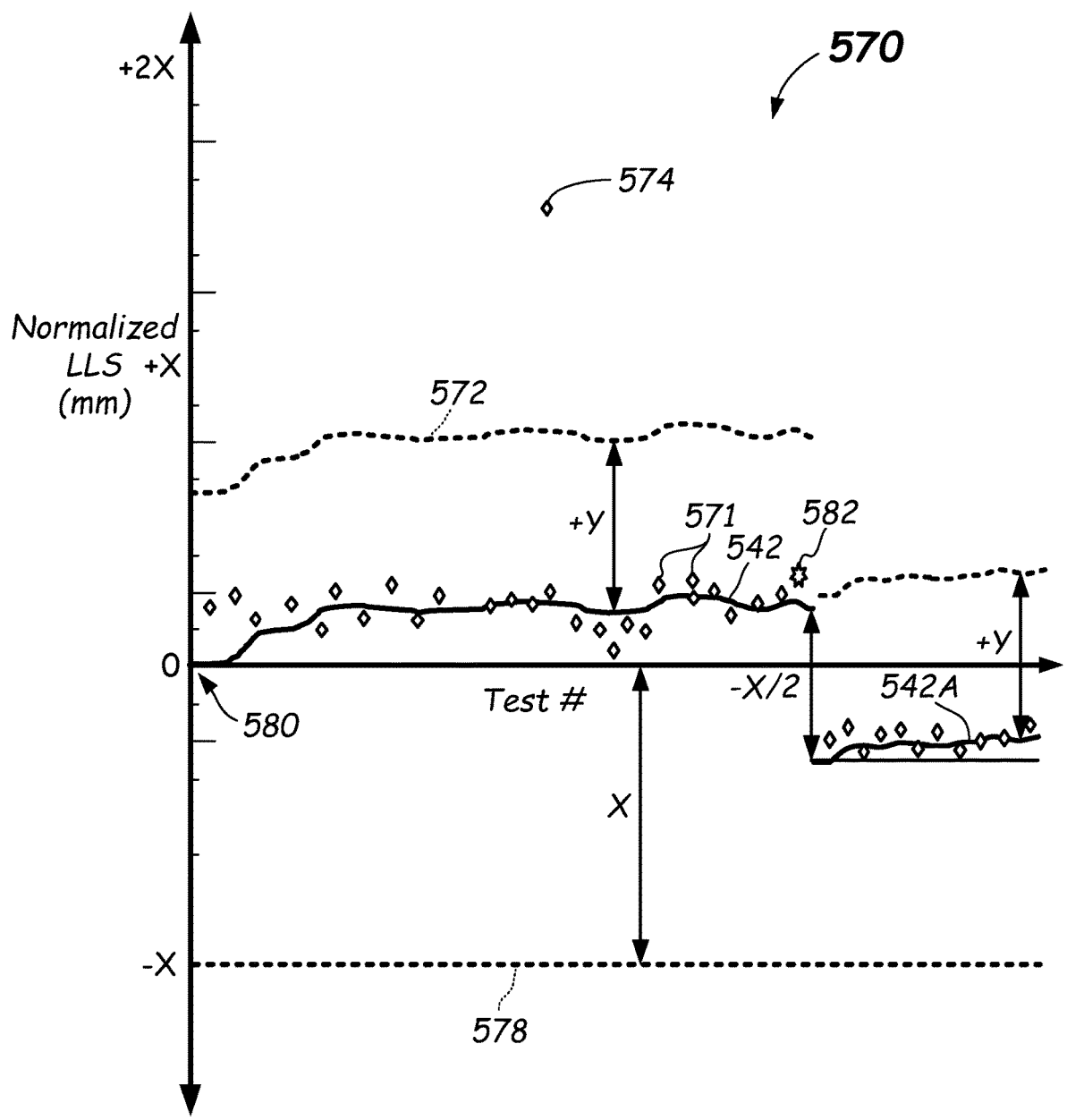
FIG. 5A illustrates a graphical plot of liquid level over successive aspirations according to embodiments of the disclosure.

Next, optionally, pre-filtering may be applied to determine if the actual measured liquid level makes sense. Pre-filtering in block 338 comprises pre-filtering to remove an outlier value before applying the multi-point filtering. In particular, in block 338, it is determined if the measured liquid level is within a pre-established pre-filter window set in block 340. The pre-filter window may be established and set in block 340 as best shown in FIG. 5A, as a preset +Y value above the measured $LL_n$ value. Optionally, the preset value can be provided by summing all the theoretical changes in ΔH over the previous aspirations for that well 107W and allowing a +/−tolerance thereabout, for example. Other means for presetting the pre-filter window in block 340 may be used. If it is found that the measured liquid level n in block 338 is not in the pre-filter window (No) set in block 340, then a correction of zero, to be described later herein, is assigned in block 342. If the measured liquid level n is determined in block 338 to be in the pre-filter window (Yes) set in block 340, then the measured liquid level n is filtered using multi-point filtering in block 344.

Figure 4A:
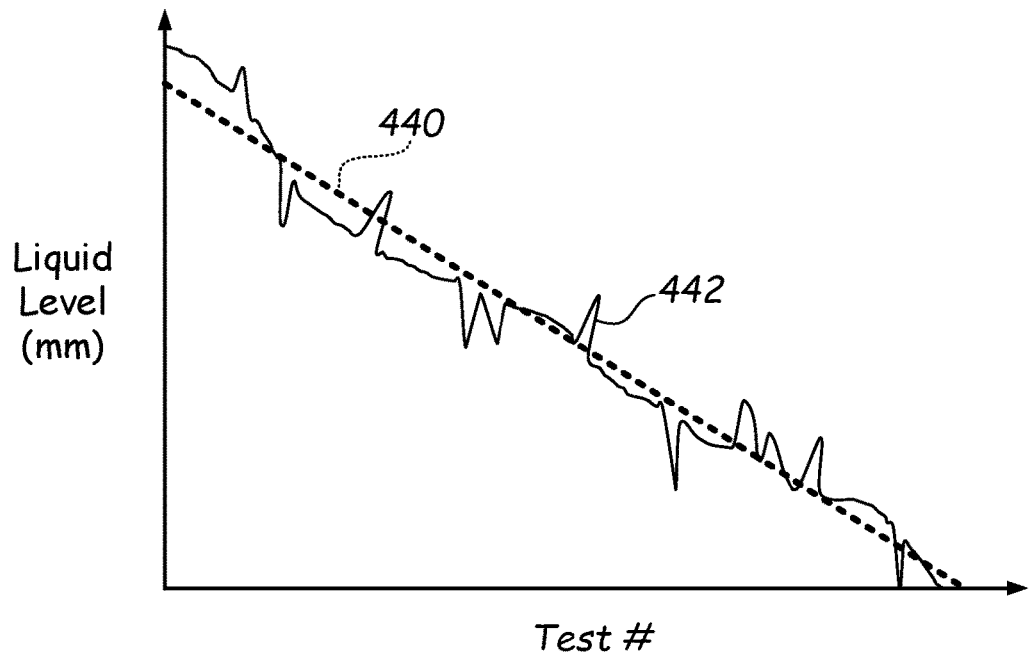
FIG. 4A-4D illustrates plots of data illustrating a method of multi-point filtering according to embodiments of the disclosure.
Figure 4B:
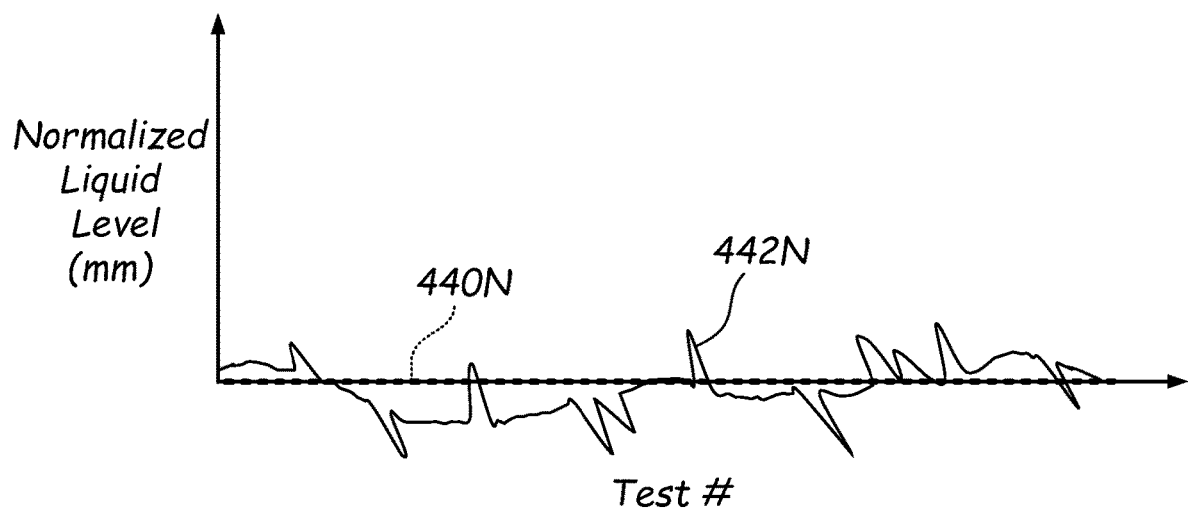

Multi-point filtering in block 344 will be further described in relation to FIGS. 4A-4D hereof. Liquid level will be abbreviated as LL herein. Likewise, liquid levels will be abbreviated as LLs herein. In particular, FIG. 4A illustrates both the theoretical LL values of the well 107W in dotted trace 440 and the actual measured LL values of the well 107W over a series of tests in solid trace 442. FIG. 4B illustrates a data set for normalized theoretical LL values in the well 107W shown in dotted trace 440N. Likewise, the normalized measured LL data for the well 107W over a number of tests is shown as solid trace 442N. The entire data set is shown. However, the method calculates a normalized LL for each new test data point on a point-by-point basis. The LL values are normalized for each test n according to the normalization equation, as follows:

$$\text{Normalized } LL_n = \text{Measured } LL_n - \text{Theoretical } LL_n$$

Figure 4C:
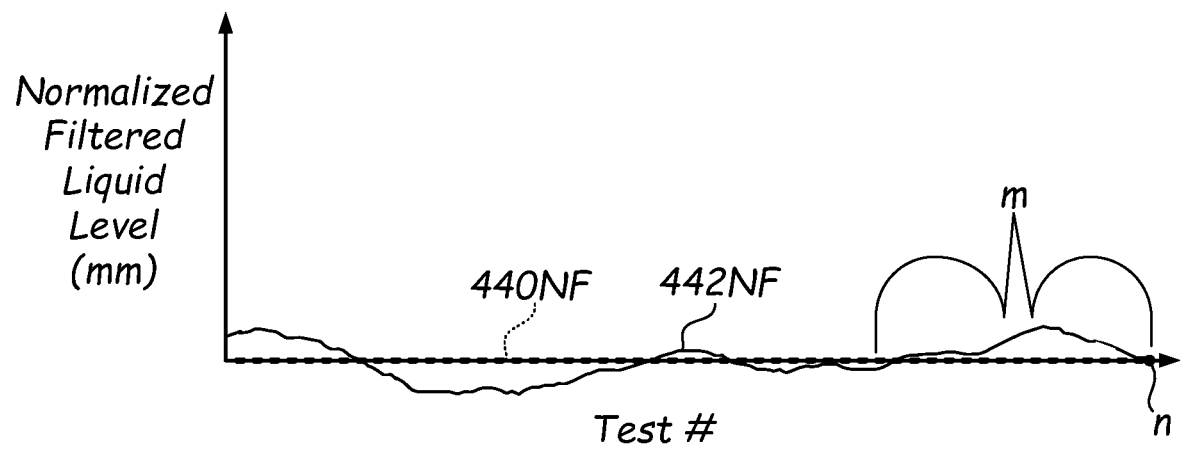

FIG. 4C illustrates a dotted trace 440NF showing a normalized and filtered theoretical liquid level over a series of tests. FIG. 4C also illustrates a solid trace 442NF of a normalized and filtered data set of actual measured values that have been normalized and filtered for a series of tests.

Figure 3A:
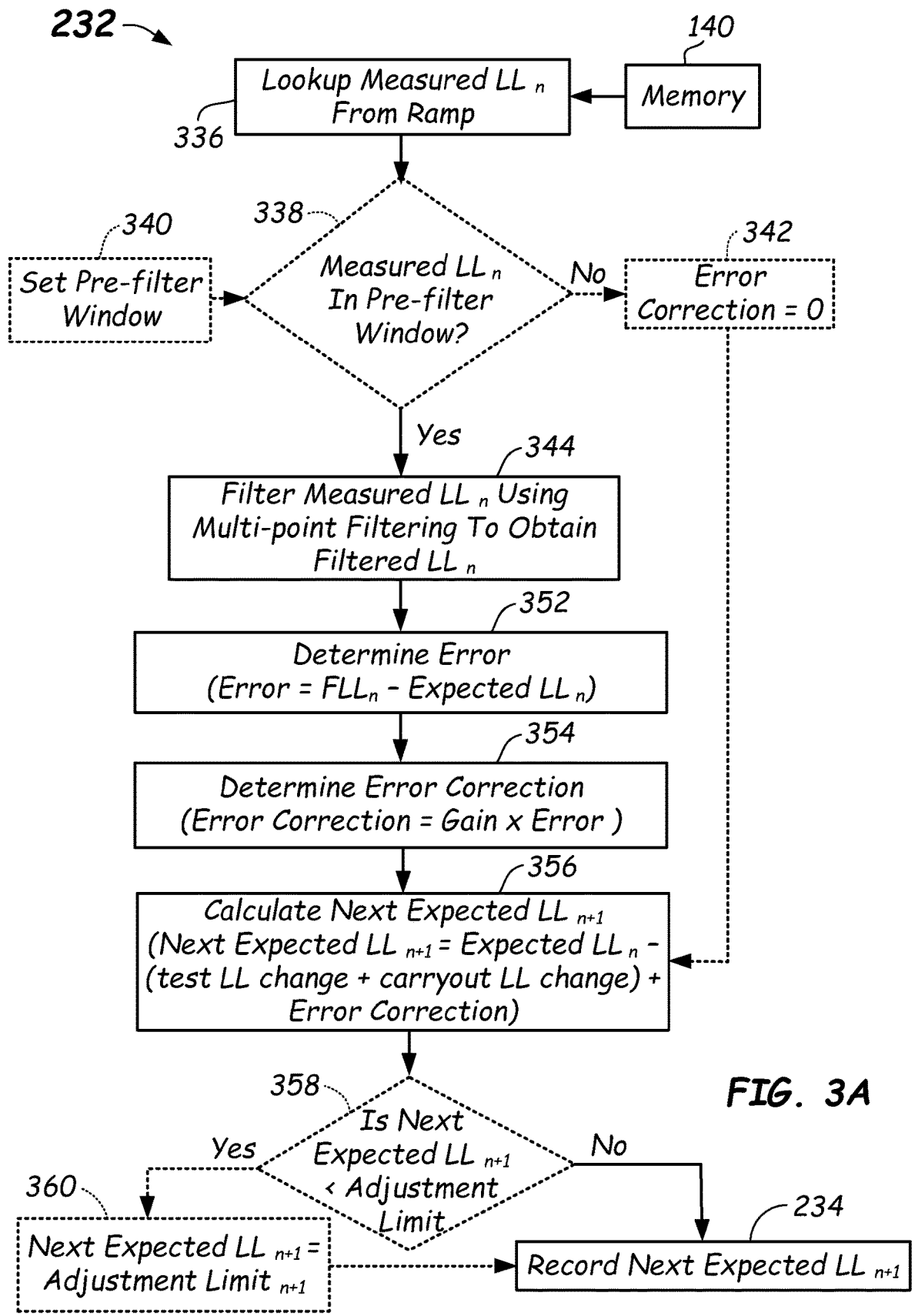
FIG. 3A illustrates a decisioning flowchart illustrating a method of calculating a next expected level using multi-point filtering and error correction according to embodiments of the disclosure.
Figure 3B:
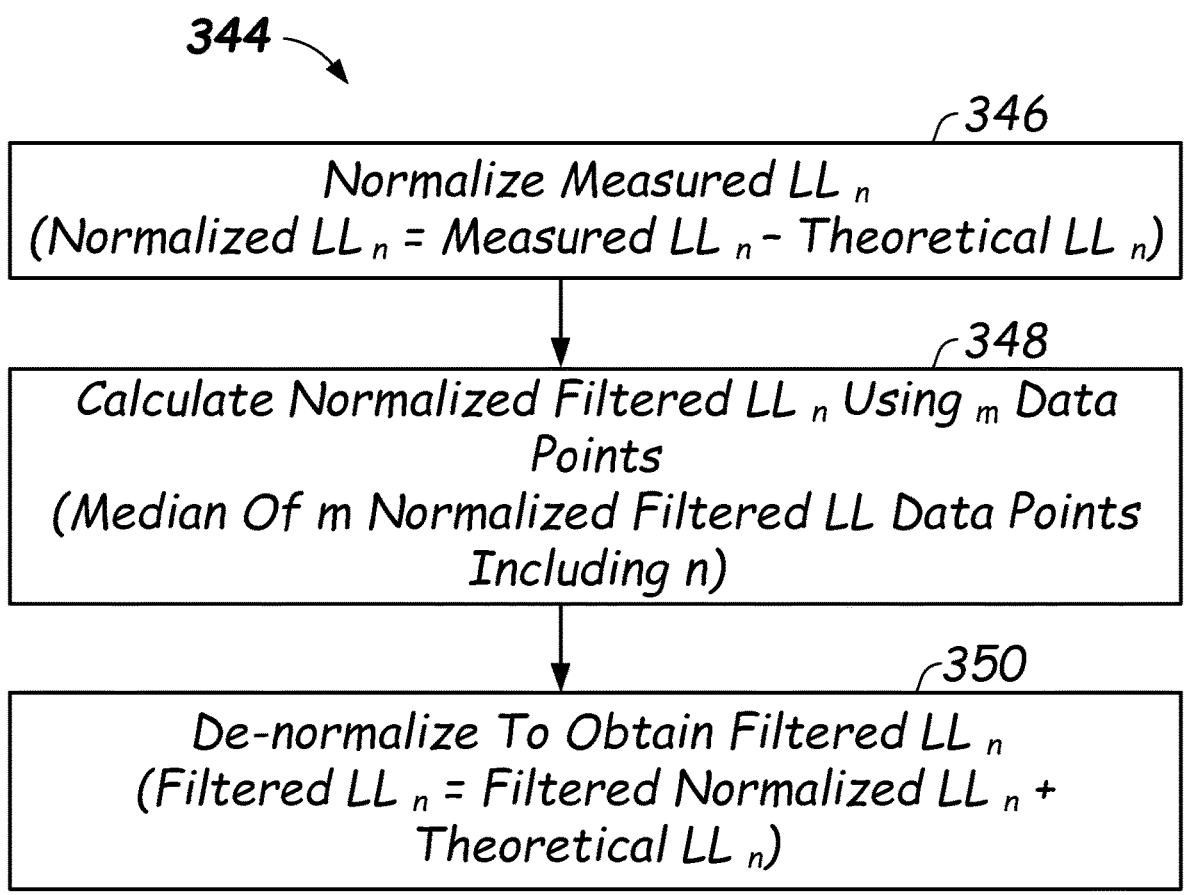
FIG. 3B illustrates a flowchart illustrating a method of multi-point filtering according to embodiments of the disclosure.

In more detail, the multi-point filtering of the test data is best shown in FIG. 3B. The multipoint filtering of block 344 involves, as shown in FIG. 3B, first normalizing the measured LL for $test_n$ in block 346 according to the equation above. A running tally of the theoretical LL for each test may be maintained in memory 140. Next, in block 348, the normalized filtered LL n is calculated. The normalized filtered $LL_n$ can be based on normalized data point n and multiple $previous_{m-1}$ normalized data points, such that m is 3 or more, 10 or more, 15 or more normalized measured LL data points. The m data points can be obtained consecutively along with point n. In some embodiments, the multi-point filter is a median filter. In particular, rather than using the n value directly, the median filter uses a median value of all the previous m normalized liquid level measurements including the latest n value, as the new median value. This new median value is the normalized filtered LL value as shown in FIG. 4C. Thus, effectively, the filtering minimizes the effect of errant LL measurements. As is shown, data point n is at the end of the collection of median data points from previous tests. The median of the m data points including data point is shown as the collection of a fixed number m of data points, wherein m can be set by experience. In some embodiments, m can be in the range of 3 to 40, or even between 5 and 20, for example. In some embodiments, rather than a median filter, a mode filter may be used where the mode value of the m data points is used, or an average filter where an average of the m data points may be used, albeit a median filter is most desired.

Next, the normalized filtered LL n is de-normalized to obtain the filtered LL n value in block 350. De-normalization is conducted according to the equation below:

$$\text{Filtered } LL_n = \text{Filtered Normalized } LL_n + \text{Theoretical } LL_n$$

Figure 4D:
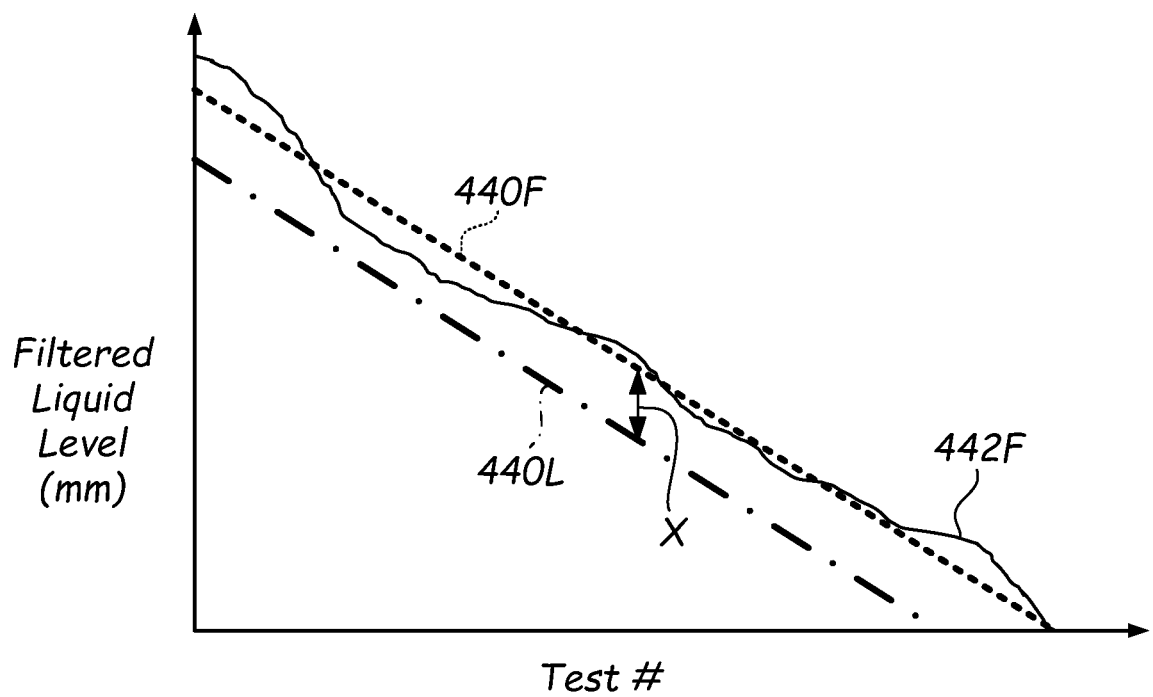

FIG. 4D illustrates de-normalized data by adding back in the theoretical values. Thus, the dotted trace 440F illustrates a de-normalized theoretical LL for the well 107W over a series of tests. Similarly, the solid trace 442F illustrates a de-normalized and filtered measured LL for the well 107W over a series of tests.

Again referring to FIG. 3A, after the multipoint filtering is completed in block 344, the method can determine an error in block 352. Determining the error can be calculated as follows:

$$\text{Error} = FLL_n - \text{Expected } LL_n$$

Once the error is determined, then an error correction to be applied can be determined in block 354. The error correction can be determined as follows:

Error Correction=Gain×Error

The gain can be constant value that is experimentally determined. The gain can have values of 0.05 to 1.5, or even from 0.05 to 0.5, for example. Both the gain and the number of points in the median filter can vary out of the above range if applied to significantly different container systems, such as when monitoring the level in the bulk container, as they are a function of the number of data points relative to the rate of change of the level.

Next, the next expected $LL_{n+1}$ value is calculated. The next expected $LL_{n+1}$ can be calculated as follows:

Next expected $LL_{n+1}$=Expected $LL_n$−(test LL change+carryout LL change)+Error Correction Thus, the next expected $LL_{n+1}$ value can be at least in part based on multi-point filtering, but additionally can be based on error correction. The test LL change is based on the lowering of the LL based on the volume of the liquid reagent 107R being aspirated for the test n. Carryout in a general sense is an accounting for expected losses in the LL, such as due to reagent carryout on the probe 104 or even losses in LL due to evaporation. In the probe carryout case, the carryout LL change (carryout) is based on the amount of change in LL due to carryout of liquid reagent 107R on the outside of the probe 104, which can be a set value determined experimentally based on the moving the probe 104 to the well depth WD (see FIG. 1) withdrawing and cleaning a number of times and then determining an average carryout per aspiration. Evaporation carryout can also be set experimentally. Thus in some embodiments, carryout can include both reagent carryout and/or evaporation carryout. Thus, calculating the next expected $LL_{n+1}$ value can take into account carryout.

Once the next expected $LL_{n+1}$ value is calculated, the next expected $LL_{n+1}$ value can be tested against an adjustment limit in block 358. The adjustment limit 440L may be set to a value for n that is X mm below the theoretical value 440F (e.g., 5-10 mm below) as shown in FIG. 4D. Thus, in block 358 if the next expected $LL_{n+1}$ is less than adjustment limit 440L (Yes), then the next expected $LL_{n+1}$ is set in block 360 to be equal to the adjustment limit for n+1. This limit value is then recorded in block 234 of FIG. 2. Alternatively, if in block 358 the next expected $LL_{n+1}$ is not less than the adjustment limit 440L (No), then the next expected $LL_{n+1}$ is recorded in block 234 of FIG. 2. Block 234 is duplicated in FIG. 3A for illustration purposes.

FIG. 5A illustrates graphically a plot 570 of LL over successive aspirations and illustrating what happens when certain anomalies are encountered. As can be seen, actual measured values 571 are shown as diamonds. The normalized median filtered trace 542 is shown as a solid line. Shown is an upper pre-filter 572 having a pre-filter limit that can be set based on experience to a value +Y above the normalized and filtered LL value for that test, for example. Thus, a point, like LL value 574 is ignored by the median filter, and the expected LL is simply adjusted down by ΔH plus carryout. The upper pre-filter 572 mitigates heavy LL sensing noise or foam from dragging the expected LL out of the liquid reagent 107R.

Although a single upper level of pre-filter limit is set at +Y is shown in FIG. 5A, the upper pre-filter 572 may have multiple pre-filter limit levels, such as allowing a wider range of +Y for the pre-filter limit for a number of aspirations after at the beginning of accessing a well 107W at 580 to allow for greater amounts of fill variation in the well 107W. Likewise, a wider pre-filter limit value of +Y may be allowed for a number of aspirations after an adjustment has been made due to an air aspiration, like at point 582. Thus, the upper pre-filter 572 comprises a pre-filter limit that can be adjusted based on the state of the container 107. For example, the state of the container may be full, for example, when the container 107 is initially accessed, of the state of the container may be such that air was just aspirated, as with after point 582. An additional pre-filter limit (not shown) may be set at a preset position above the bottom of the well 107W.

Additionally, a lower normalized adjustment limit 578 is shown that prevents false pressure errors from pushing the probe 104 too deep. No value of normalized expected LL can cross this normalized adjustment limit 578. The adjustment limit can be set to any desirable level X, where X may be 5 mm to 10 mm, for example.

As can be seen at the beginning of testing at point 580, there are no previous measured LL values, so the expected LL and theoretical normalized values are the same. In some embodiments, the median filter can be pre-populated with zeros enough to fill approximately half the filter (e.g., 8 zeros for a 15 point median filter). Then the median filter will not react until the 9th point, and then the median filter can begin to operate and adjust the expected filtered LL values 542. Of course, the median filter can be loaded with fewer zeros to make the median filter start to respond in a few number of aspirations. However, this is at the expense of being less able to reject noise. Optionally, more zeroes can be pre-populated in the median filter so that the filter will respond after a larger number of aspirations, and will be better at rejecting noise.

Also shown is an event that illustrates an air aspiration at LL measurement 582. When an air aspiration is determined, the probe 104 adjusts downward by X/2 or other suitable value on the next aspiration to a new location so that the tip of the probe 104 is approximately X/2 below the LL. Also, the pre-filter value 572 is reset, such as to a value Y above the normalized filtered LL. Again the expected LL and theoretical LL are identical until 3 data points (LL measurements) are included in the median filter, after which the median filtering can start to adjust the next expected L.

Figure 5B:
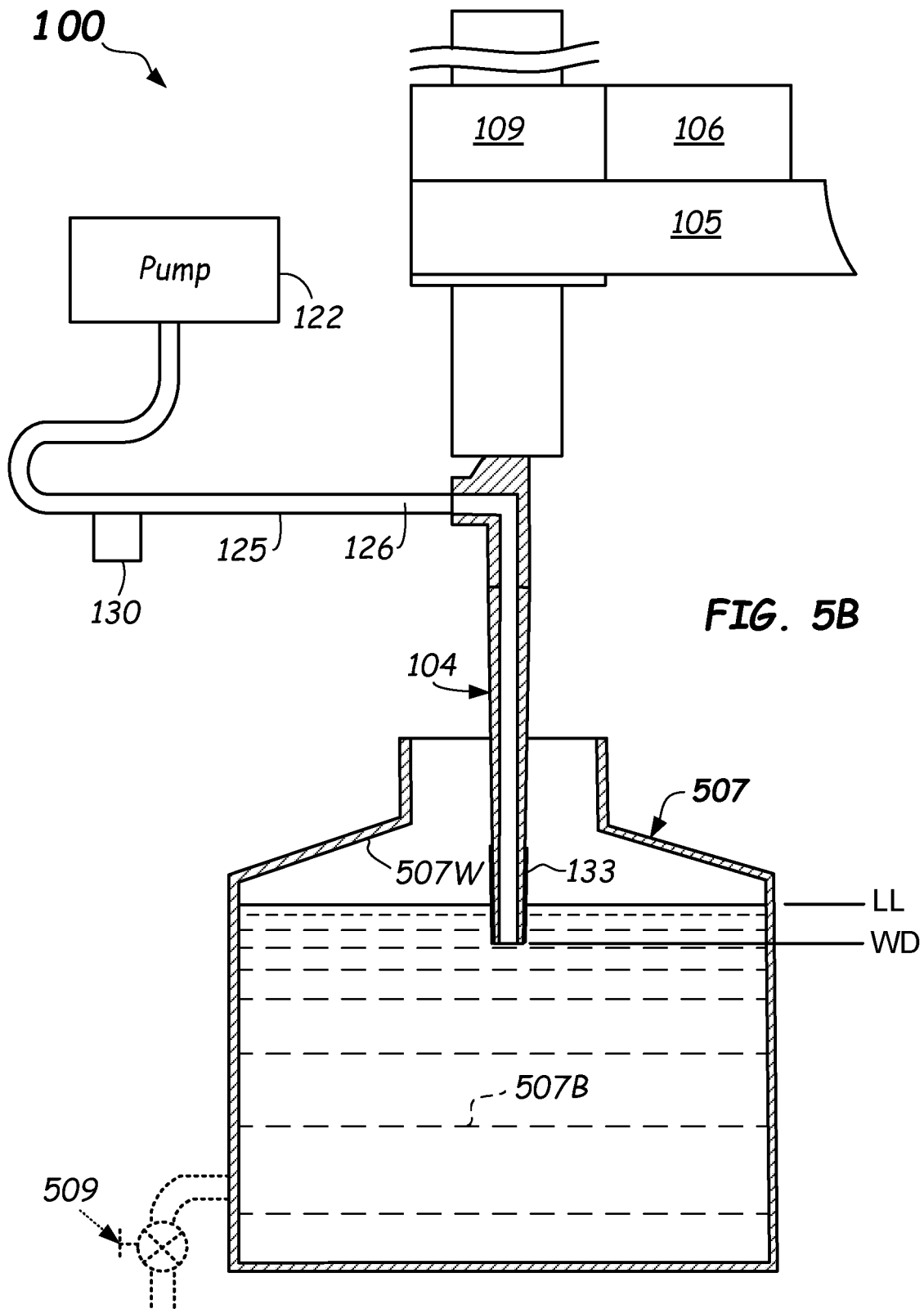
FIG. 5B illustrates a schematic diagram of a portion of an aspirating apparatus including liquid level measurement inserted into a well of a bulk reagent container according to embodiments of the disclosure.
Figure 8:
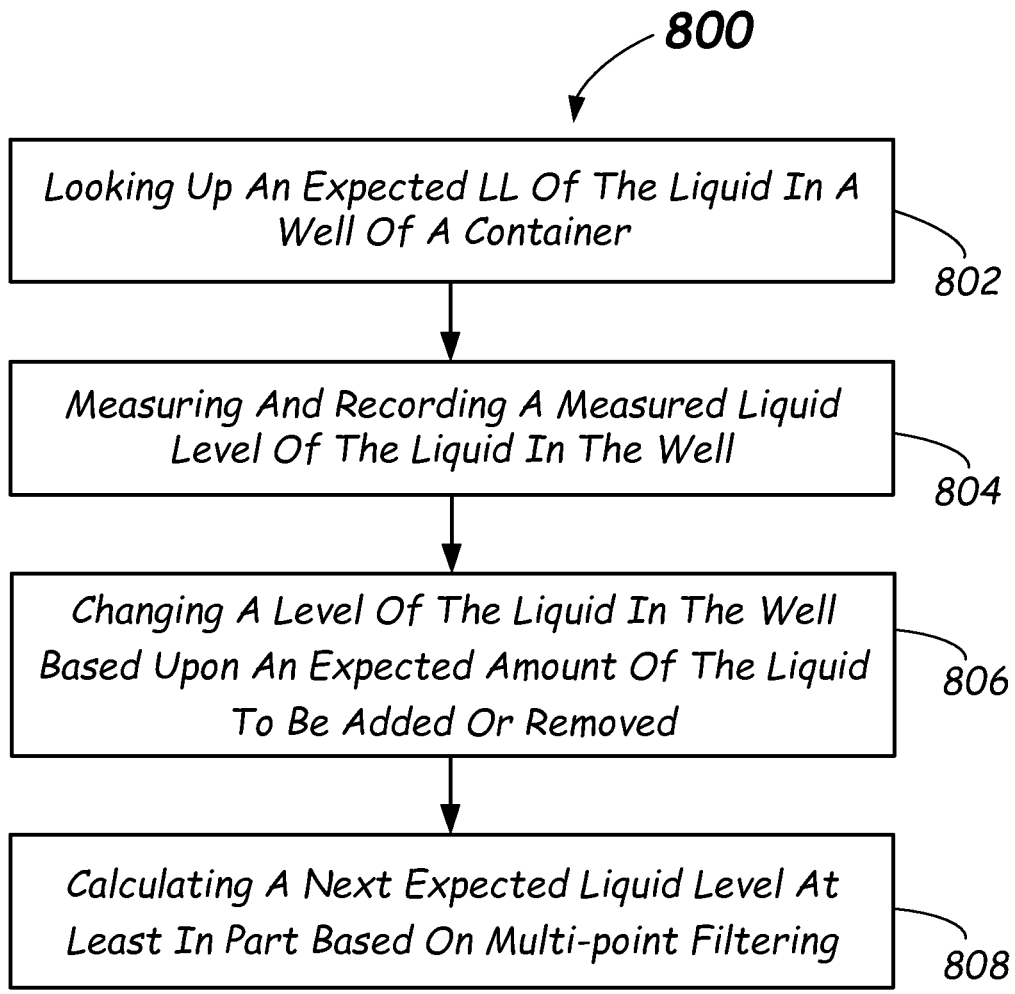
FIG. 8 illustrates another flowchart illustrating methods of method of detecting a level of a liquid in a well according to embodiments.

FIG. 5B illustrates a schematic diagram of a portion of an aspirating apparatus 100 including liquid level measurement and a liquid level sensor 133 inserted into a well 507W of a bulk container 507. The methods 200 described herein, with slight modifications, are equally applicable to accurate measurement of a liquid level of a bulk liquid 507B contained in a bulk container 507. The method 800 can reject errors due to waves or splashes on the bulk liquid 507B due to liquid motion or vibration. Moreover, the methods 800 described herein in FIG. 8, are equally applicable to accurate measurement of a liquid level of process liquid (e.g., deionized water) in a process water container, cleaning liquid in a cleaning liquid container, waste liquid in a waste container, or any other container that has a changing (e.g., diminishing or increasing) liquid level, whether or not it is accessed and aspirated by or dispensed into by a probe 104. In these examples, the method 800 could reject errors due to waves or splashes on the bulk liquid 507B due to entry or exit of the liquid such when a valve 509 is opened or closed or when waste liquid is poured in.

Figure 6:
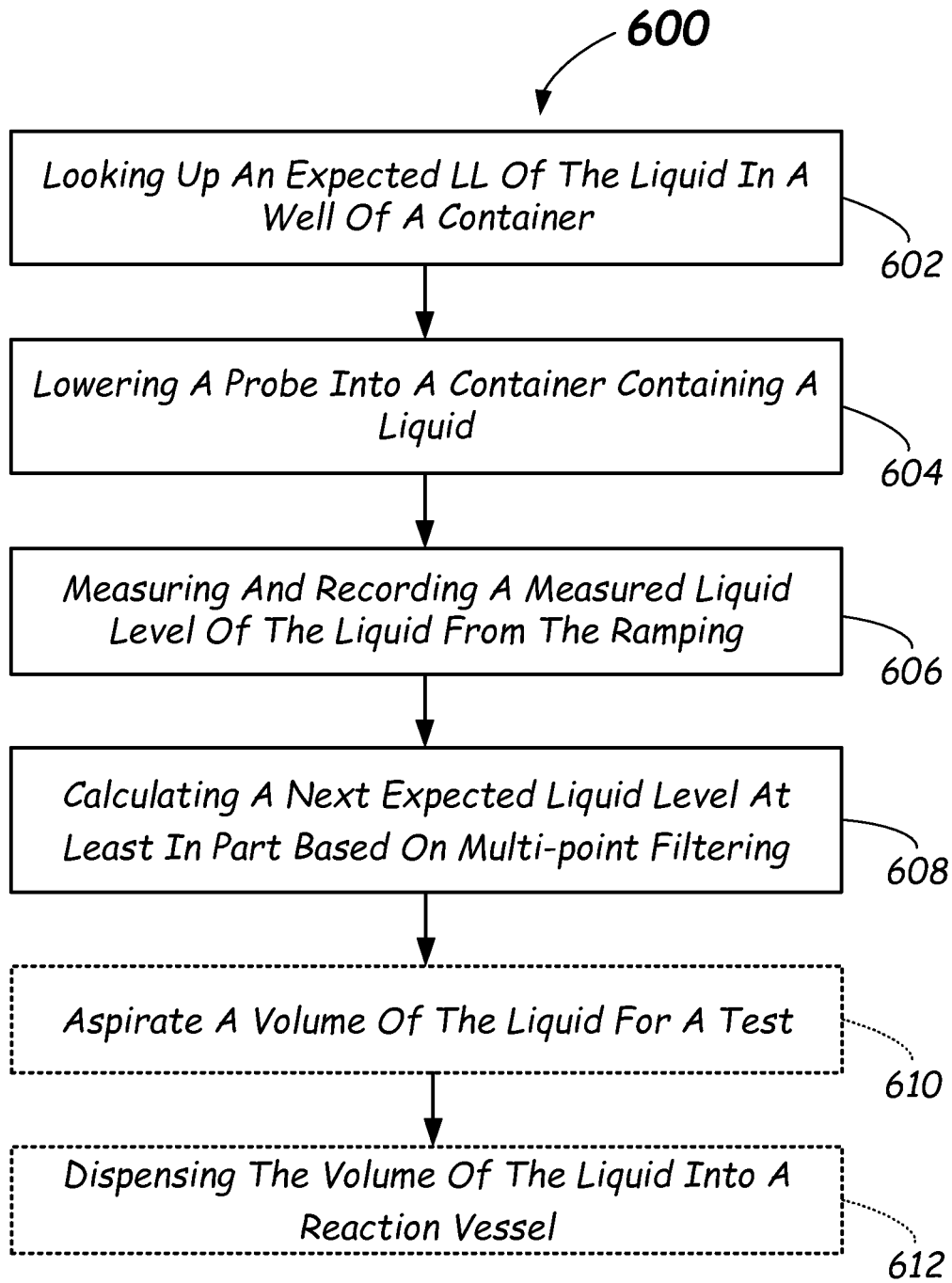
FIG. 6 illustrates a flowchart illustrating methods of detecting a location of a top liquid surface of a liquid in a well according to embodiments.

Referring now to FIG. 6, a broad method of the disclosure is illustrated. The method 600 includes, in 602, looking up an expected liquid level of the liquid (e.g., liquid reagent 107R) in the well (e.g., well 107W, 507W). If the test is the first test, then the level is the theoretical LL. After at least three readings are taken, then the expected LL is the filtered $LL_{n+1}$ that is stored in memory 140. The method 600 further includes, in block 604, ramping a probe (e.g., probe 104) into the well (e.g., well 107W, 507W) containing the liquid (e.g., liquid reagent 107R) to a well depth (WD). Method 600 includes, in block 606, measuring and recording a measured liquid level (e.g., measured $LL_n$) of the liquid (e.g., liquid reagent 107R) from the ramping; and, in block 608, calculating a next expected liquid level (e.g., next expected $LL_{n+1}$) based at least in part on multi-point filtering. However, the calculation may also include error correction, i.e., a combination of multi-point filtering and error correction. Multi-point filtering is described in FIG. 3B. The combination of multi-point filtering and error correction is shown and described with reference to FIG. 3A. In some embodiments, the method 600 includes, in block 610, aspirating a volume of the liquid for a test, and in block 612, dispensing the volume of the liquid into a reaction vessel (e.g., reaction vessel 113).

In some embodiments, such as in the example using a bulk container 507, like is shown in FIG. 5B, bulk liquid 507B may be added or subtracted from the bulk container 507 without the use of a probe 104. For example, the bulk liquid 507B can be added or subtracted through fixed ports formed in the sides or bottom of the bulk container 507 or through the spout opening. For example, a fixed port with a valve is shown dotted as valve 509 can be used to withdraw bulk liquid 507B from the bulk container 507 to be used, such as in a test. Likewise, waste liquid from a test just completed can be added. Moreover, a cleaning solution may be withdrawn, such as with a valve 509, and used, for example, in a test. Such liquid levels in the bulk container 507 can be tallied more accurately using the method comprising multi-point filtering.

In this example, a LL sensor would be included to detect the liquid level LL of the top liquid surface. Any suitable LL sensor may be used. The LL sensor could be a stationary sensing device, such as a float on a sensor stalk, a capacitive sensor, or even a precision scale measuring weight, which can be measured and converted to obtain the measured LL. In this case, the weight scale would also be considered a LL sensor. The present method 700, 800 can be used to more accurately determine the next expected liquid level (e.g., next expected $LL_{n+1}$), and thus provide more accurate estimation of liquid level over time.

Figure 7:
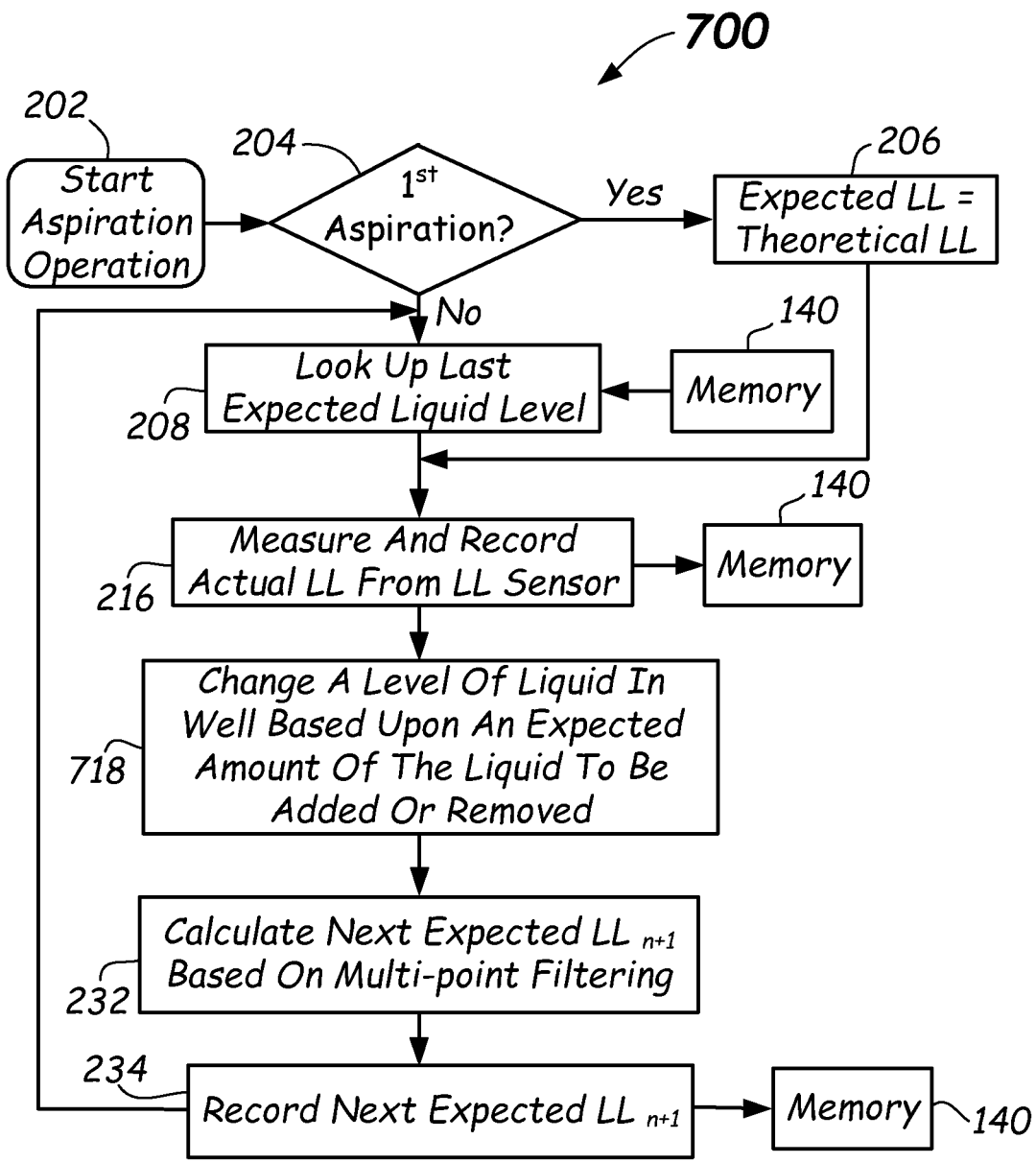
FIG. 7 illustrates another flowchart illustrating methods of detecting a liquid level of a liquid in a well of a container according to embodiments of the disclosure.

Now referring to FIG. 7, a method 700 of detecting a level of a liquid (e.g., a process liquid, a cleaning liquid, or a waste liquid) in a well 507W of a container (e.g., bulk container 507) is provided. The method 700 is identical to the method 200 described in FIG. 2, except that the non-essential aspects are removed and the liquid is removed or added, by dispensing into the spout or adding in or removing through a port located in the side or bottom of the bulk container 507. Like numerals are used for like blocks as compared to FIG. 2, except in block 718 which calls out changing a level of the liquid in the well having an expected level change, such as based upon a test, as opposed to aspirating with a probe 104.

Thus, in a broad sense, as shown in FIG. 8, the method comprises, in block 802, looking up an expected liquid level (e.g., expected LL) of the liquid (e.g., bulk liquid 507B) in the well (e.g., well 507W) of a container (e.g., bulk container 507). The method 800 includes, in block 804, measuring and recording a measured liquid level of the liquid (e.g., bulk liquid 507B) in the well (e.g., well 507W). According to the method 800, block 806 comprises changing a level of the liquid in the well based upon an expected liquid to be added or removed. The expected amount of the liquid to be added or removed can be based upon the requirements of a test. For example, the test may require a defined amount or process liquid for a test. Likewise, if the liquid is a cleaning liquid, then a defined amount of the cleaning liquid may be used for the cleaning operation. If the liquid is a waste liquid, then for each test, there may be a defined volume of waste liquid that is an expected amount of the waste liquid that is added to the well 507W. The test can be a test on a bio-liquid as described herein and the bulk liquid 507B is used in the test in a defined amount. Thus, if the bulk liquid 507B is a process liquid or cleaning liquid, a defined target volume is required to be used for each test. As in the previous method, the method 800 involves, in block 808, calculating a next expected liquid level (e.g., next expected $LL_{n+1}$) at least in part based on multi-point filtering, which is described in FIG. 3B. Error correction may be used in addition to the multipoint filtering as is shown in blocks 352 through 356 of FIG. 3A. Pre-filter windows, and adjustment limits may also be used as are shown in blocks 340, 338, and 342, and blocks 358 and 360, respectively.

Having shown some example embodiments, those skilled in the art will realize many variations are possible that will still be within the scope of the disclosure. Therefore, it is the intention to limit the disclosure only as indicated by the scope of the claims and their equivalents.

What is claimed is:

1. A method of detecting a level of a liquid in a well, comprising:
   looking up in a memory an expected liquid level of the liquid in the well;
   ramping a probe into the well containing the liquid to a well depth;
   measuring and recording a measured liquid level of the liquid from the ramping; and
   calculating a next expected liquid level at least in part based on multi-point filtering and adjusting a depth of insertion of the probe into the well based on the next expected liquid level, wherein the next expected liquid level is used as the detected level of liquid in the well, further wherein the multi-point filtering comprises subtracting the expected liquid level from the measured liquid level to obtain a current normalized measured liquid level, calculating a current normalized filtered liquid level using an average filter, median filter, or mode filter on previous normalized measured liquid levels and the current normalized measured liquid level, and de-normalizing the current normalized filtered liquid level by adding the current normalized filtered liquid level to the expected liquid level to obtain the next expected liquid level.

2. The method of claim 1, wherein the calculating of the next expected liquid level is further based on applying an error correction to the next expected liquid level.

3. The method of claim 2, wherein the error correction is equal to an error times a gain.

4. The method of claim 1, wherein the calculating of the next expected liquid level further includes accounting for carryout.

5. The method of claim 1, wherein the multi-point filtering is accomplished using a median filter.

6. The method of claim 5, wherein the median filter uses a median value derived from 3 or more measured level values.

7. The method of claim 6, wherein the median filter uses the median value from 10 or more consecutively-obtained values.

8. The method of claim 6, wherein the median filter uses the median value from 15 or more consecutively-obtained values.

9. The method of claim 1, wherein the multi-point filtering is accomplished using a mode filter or an average filter.

10. The method of claim 1, comprising pre-filtering to remove an outlier value before applying the multi-point filtering.

11. The method of claim 10, wherein the pre-filtering comprises a pre-filter limit that is adjusted based on a state of a container containing the liquid.

12. The method of claim 1, comprising employing an adjustment limit so as to limit any adjustment from a next theoretical liquid level for the next expected liquid level.

13. The method of claim 1, comprising aspirating a volume of the liquid designated for a test prior to the calculating.

14. The method of claim 1, wherein the liquid in the well is a reagent liquid.

15. The method of claim 1, wherein the liquid in the well is water, a waste liquid, or a cleaning liquid.

16. The method of claim 1, comprising performing an aspiration quality verification after an aspiration.

17. The method of claim 16, comprising adjusting a probe position downward with an adjustment when the aspiration quality verification detects that air was aspirated.

18. The method of claim 1, wherein the measuring of the measured liquid level takes place during the ramping.

19. A method of detecting a level of a liquid in a well, comprising:
  looking up in a memory an expected liquid level of the liquid in the well of a container;
  measuring and recording a measured liquid level of the liquid in the well;
  changing a level of the liquid in the well based upon an expected amount of the liquid to be added or removed; and
  calculating a next expected liquid level at least in part based on multi-point filtering and adjusting a depth of insertion of the probe into the well based on the next expected liquid level, wherein the next expected liquid level is used as the detected level of liquid in the well, further wherein the multi-point filtering comprises subtracting the expected liquid level from the measured liquid level to obtain a current normalized measured liquid level, calculating a current normalized filtered liquid level using an average filter, median filter, or mode filter on previous normalized measured liquid levels and the current normalized measured liquid level, and de-normalizing the current normalized filtered liquid level by adding the current normalized filtered liquid level to the expected liquid level to obtain the next expected liquid level.

20. A liquid level detection apparatus, comprising:
  a liquid level sensor configured to obtain liquid level measurements of a liquid in a well;
  a memory configured to store an expected liquid level of the liquid in the well; and
  a processor configured to receive the liquid level measurements and calculate according to a multi-point filtering module a next expected liquid level, wherein the multi-point filtering module is configured to subtract the expected liquid level from a current measured liquid level to obtain a current normalized measured liquid level, calculate a current normalized filtered liquid level using an average filter, median filter, or mode filter on previous normalized measured liquid levels and the current normalized measured liquid level, and de-normalize the current normalized filtered liquid level by adding the current normalized filtered liquid level to the expected liquid level to obtain the next expected liquid level.

21. The liquid level detection apparatus of claim 20, comprising a probe configured to aspirate the liquid.

* * * * *